United States Patent
Shim et al.

(10) Patent No.: US 9,843,916 B2
(45) Date of Patent: Dec. 12, 2017

(54) SYSTEMS AND METHODS FOR AUTOMATIC EMERGENCY CONTACT ROUTING

(71) Applicant: NEBULYS TECHNOLOGIES, INC., Frederick, MD (US)

(72) Inventors: Paul C. Shim, Gaithersburg, MD (US); Kyung-Hee Kim, Gaithersburg, MD (US); Jiseok Lee, Gaithersburg, MD (US)

( * ) Notice: Subject to any disclaimer, the term of this patent is extended or adjusted under 35 U.S.C. 154(b) by 0 days.

(21) Appl. No.: 14/977,070

(22) Filed: Dec. 21, 2015

(65) Prior Publication Data

US 2016/0345150 A1    Nov. 24, 2016

Related U.S. Application Data

(60) Provisional application No. 62/165,212, filed on May 22, 2015.

(51) Int. Cl.

| | | |
|---|---|---|
| H04W 4/22 | (2009.01) | |
| H04W 40/24 | (2009.01) | |
| H04M 1/725 | (2006.01) | |
| H04W 4/12 | (2009.01) | |
| H04W 64/00 | (2009.01) | |
| H04W 88/02 | (2009.01) | |

(52) U.S. Cl.
CPC ......... *H04W 4/22* (2013.01); *H04M 1/72541* (2013.01); *H04W 4/12* (2013.01); *H04W 40/246* (2013.01); *H04W 64/006* (2013.01); *H04W 88/02* (2013.01)

(58) Field of Classification Search
CPC ... H04W 4/22; H04W 40/246; H04W 64/006; H04W 4/12; H04W 88/02; H04M 1/72541
See application file for complete search history.

(56) References Cited

U.S. PATENT DOCUMENTS

| | | |
|---|---|---|
| 5,109,399 A | 4/1992 | Thompson |
| 6,067,356 A | 5/2000 | Lautenschlager et al. |
| 6,771,742 B2 | 8/2004 | McCalmont et al. |
| 7,366,157 B1 | 4/2008 | Valentine et al. |
| 7,496,182 B2 | 2/2009 | Coster et al. |
| 8,116,724 B2 | 2/2012 | Peabody |
| 8,254,785 B1 * | 8/2012 | Bushman ........... H04B 10/1141 398/115 |
| 8,559,913 B2 | 10/2013 | Thijs et al. |

(Continued)

*Primary Examiner* — Brandon Miller

(57) ABSTRACT

An emergency routing apparatus may include receiving a request for help from a portable device and processing the request to contact an appropriate emergency call center. The emergency call center may be determined based on location of the mobile device that is received with the request for help. If a connection can be established over a first communication link, the request for help may be transmitted to the emergency call center over the first communication link. If a connection cannot be established over the first communication link, another communication link may be used to transmit the request for help to the emergency call center. Transmitting the request for help over the other communication link may include dialing a phone number of the emergency call center and playing a message with the request for help over the other communication link.

20 Claims, 8 Drawing Sheets

(56) References Cited

U.S. PATENT DOCUMENTS

| | | |
|---|---|---|
| 8,588,733 B2 | 11/2013 | Ferguson et al. |
| 8,624,727 B2 | 1/2014 | Saigh et al. |
| 2003/0227922 A1 | 12/2003 | Horvath et al. |
| 2008/0081646 A1* | 4/2008 | Morin .................... H04W 4/02 455/466 |
| 2010/0023528 A1* | 1/2010 | Cion .................... G06F 19/323 707/E17.01 |
| 2010/0190468 A1* | 7/2010 | Scott .................. H04M 1/2745 455/404.2 |
| 2011/0223881 A1* | 9/2011 | Brok den ................ H04W 4/22 455/404.2 |
| 2012/0088468 A1 | 4/2012 | Dickinson et al. |
| 2012/0237002 A1* | 9/2012 | Sennett .................. H04W 4/12 379/45 |
| 2013/0078942 A1* | 3/2013 | Owens .................... H04W 4/22 455/404.2 |
| 2014/0361874 A1 | 12/2014 | Mandalapu |
| 2015/0154646 A1* | 6/2015 | Mishra .................. G06Q 50/24 705/3 |

\* cited by examiner

200

400

600

700

800

SYSTEMS AND METHODS FOR AUTOMATIC EMERGENCY CONTACT ROUTING

CROSS-REFERENCES TO RELATED APPLICATIONS

The present application claims priority to U.S. Provisional Application No. 62/165,212, filed on May 22, 2015, the entirety of which is incorporated by reference herein.

BACKGROUND

The subject matter of this application is directed to automatic emergency contact routing and more specifically to systems and methods for automatically locating and contacting an emergency call center (e.g., a Public Safety Answering Point (PSAP) and/or a Central Emergency Routing Center) in response to receiving a request for help with location information from a mobile device (e.g., a wearable device having a one touch emergency button).

Individuals with certain medical conditions or individuals in their old age need constant monitoring so that assistance or medical care can be quickly provided or requested when it is needed. However, due to rising cost of communities where individuals can be regularly monitored and individual's desire to have flexibility to move around, more and more people are choosing to remain in their own residences. At the individual's home, when medical assistance is needed the individual can request medical or other assistance by calling an emergency call center (e.g., 911 center). There are sufficient technologies to locate the origination of the emergency call when a person dialed an emergency number using a home phone and was not able to provide location information. However, the individual out of their residence needing help may not be able to provide the current location nor his/her profile to request medical or other needed assistance due to the medical emergency. In some cases, even if the individual needing help is able to contact the emergency personnel, the individual needing help is not always able to relay information about the emergency and medical profile that is often times needed to quickly request the specific kind of help needed.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

DETAILED DESCRIPTION

The present disclosure provides systems and methods automatically routing an emergency request for help. An emergency routing apparatus may include receiving a request for help from a mobile device and processing the request to contact an appropriate emergency call center. The appropriate emergency call center may be determined based on location of the mobile device that is received with the request for help. If a connection can be established over a first communication link, the request for help may be transmitted to the emergency call center over the first communication link. If a connection cannot be established over the first communication link, another communication link may be used to transmit the request for help to the emergency call center. Transmitting the request for help over the other communication link may include dialing a phone number of the emergency call center and playing a message with the request for help over the other communication link.

The present disclosure also provides systems and methods for automatic emergency request that can be made by a single user input on a mobile device. The mobile device may be a portable device (e.g., a smartphone) or a wearable device (e.g., smartwatch or an activity tracker). The single input may be made via a physical button with mechanical and electrical switch mechanism provided on the mobile device or a software emergency button on a touch screen implemented in an application executed on the mobile device.

Thus, the systems and methods of this disclosure provide the ability to automatically request assistance to an appropriate emergency call center even when the person cannot dial emergency number and/or cannot speak due to the emergency. The embodiment of this disclosure provide for systems and methods that can quickly contact the correct emergency call center and/or personnel with very little action from the person needing the assistance.

Other objectives and advantages of the present invention will become apparent to the reader and it is intended that these objectives and advantages are within the scope of the present disclosure.

Figure 1:
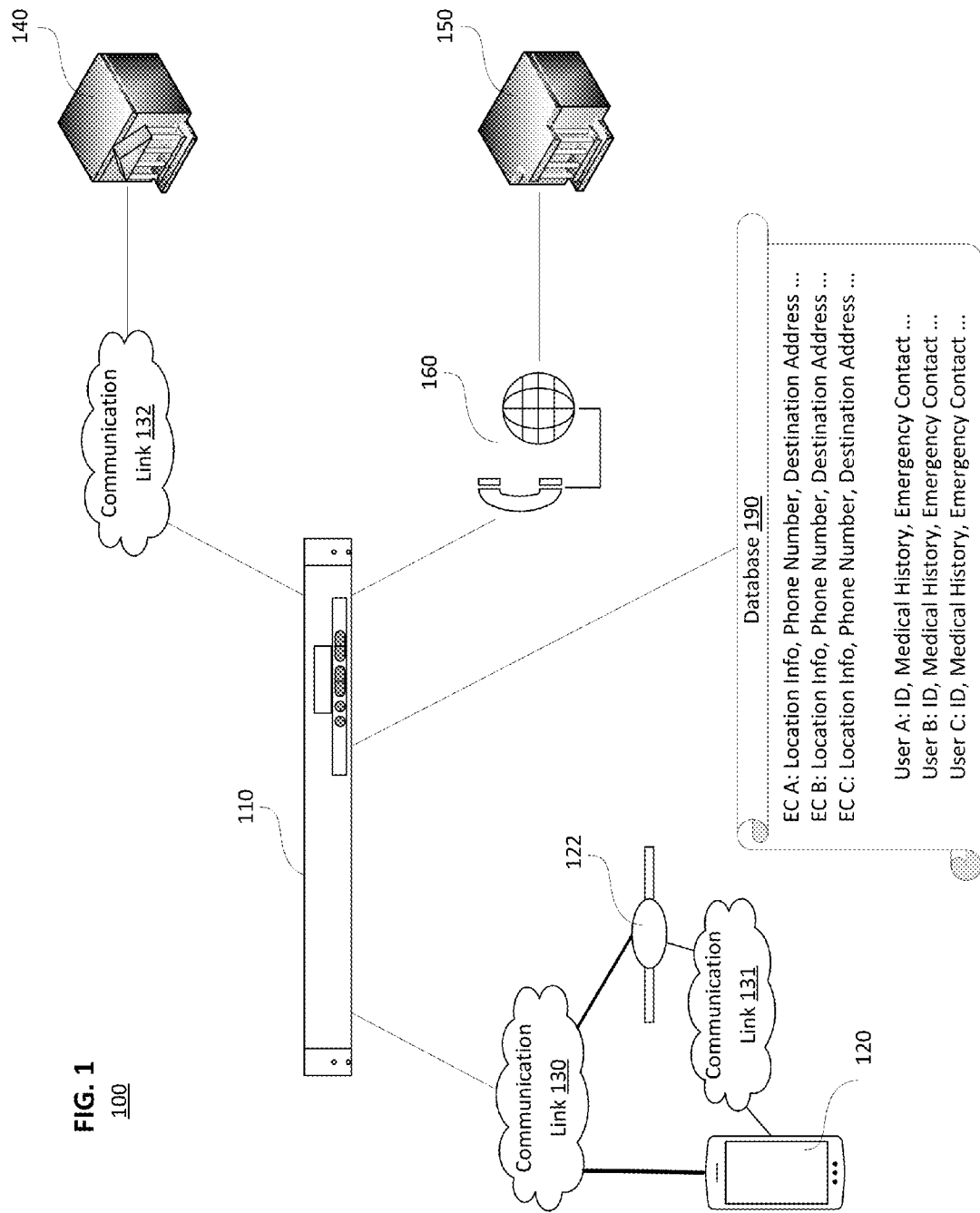
FIG. 1 illustrates a system for automatic emergency contact routing according to an embodiment of the present disclosure.

FIG. 1 illustrates a system 100 for automatic emergency contact routing according to an embodiment of the present disclosure. The system 100 may include an automatic emergency routing device (AERD) 110 including hardware and software components configured to receive a request for help from one or more mobile devices 120, 122 when help is requested at the one or more mobile devices 120, 122, and based on the received request for help, transmit location, personal and/or medical profile information with a request for help to one or more emergency call centers 140, 150.

The request for help from the one or more mobile devices 120, 122 may be received when an individual associated with the mobile device 120 or 122 initiates a request for help. As discussed in more detail below, the request for help may be initiated with a single operation (e.g., single button operation) and/or by detecting an incapacitated person. An incapacitated person may include a person who is physically incapacitated (e.g., unable to move and/or respond).

The mobile device 120 may be a smartphone, PDA, cellphone, smart glasses, tablet device, pad device, or another portable electronic device. The mobile device 122 may be a wearable device such as a watch, bracelet, activity tracker, a health monitoring device, or other wearable devices. When the request for help is requested at the mobile device 120 or 122, a request for help with information stored in the mobile device and/or captured by the mobile device may be automatically transmitted to the automatic emergency routing device 110. As will be discussed in more detail below, the transmitted information may include location of the mobile device, identification information of the individual associated with the mobile device, medical information (e.g., medical history and/or medical profile), physician information, emergency contact information, and/or data captured by the mobile device (e.g., images, sound, heart rate and/or motion data).

The mobile device 120 and/or 122 may communicate with the automatic emergency routing device 110 via communication link 130. The communication link 130 may be a different communication link from the communication link 132 linking the automatic emergency routing device 110 to the emergency call center 140. In one embodiment, the communication link 130 may be a part of the communication link 132. The communication links 130 and/or 132 may provide communication between the mobile device 120 and/or 122, the automatic emergency routing device 110, and emergency call center 140 which are all located at different locations from each other. In one embodiment, the wearable device 122 may connect to the communication link 130 via the communication link 131 and the mobile device 120 or another device (e.g., a router, a local wireless network, and/or personal area network using Bluetooth). In one embodiment, the mobile device 120 and/or 122 may directly connect to the automatic emergency routing device 110 via the communication link 130.

The automatic emergency routing device 110 may determine, based on the location information provided in the request from the mobile device 120 or 122 and/or data stored in the automatic emergency routing device 110, to which emergency call center to send the request for help. For example, the automatic emergency routing device 110 may determine, based on the location information provided with the request for help and location of various emergency call centers, an emergency call center 140/150 which is located in the closest vicinity of the location of the mobile device requesting help. Based on the determination of the closest emergency call center 140/150, the automatic emergency routing device 110 may transmit data to the emergency call center 140 with a request for help. The data transmitted to the emergency call center 140 may be transmitted over the communication link 132.

The location of various emergency call centers (EC A, EC B, and EC C) may be provided in a database 190 stored in storage provided in the automatic emergency routing device 110, coupled to the automatic emergency routing device 110, or at a remote location accessed via one of the communication links. The database 190 may include other information about the emergency call centers (e.g., phone numbers and/or destination addresses). The database 190 may optionally include information about registered users (e.g., User A, User B, and User C). The same or a different database may be used to store the information for the emergency call centers and the registered users.

When it is determined by the automatic emergency routing device 110 that data cannot be transmitted to the emergency call center 140 over the communication link 132, the automatic emergency routing device 110 may transmit a request for help to the emergency call center 150 over another communication link 160 (e.g., a telephone network). The communication link 160 may be different and separate from the communication link 132. In one embodiment, the communication link 160 may be part of the communication link 132 but provide a different type of connection to the emergency call center 150 as compared to the connection provided to the emergency call center 140.

When communicating over a telephone network with the emergency call center 150, the automatic emergency routing device 110 may automatically make a call to the emergency call center 150 and play an automatically generated voice message with a request for help. The generated voice message may be repeatedly played when the emergency call center 150 answers the call. The audio signal of the voice message may be generated to provide information received in the request from the mobile device and/or data stored in the automatic emergency routing device 110. In some embodiments, the automatic emergency routing device 110 may generate and transmit the audio message requesting help using voice over IP technology.

The emergency call center 140 or 150 may be an emergency call center (e.g., 911 call center) such as a Public Safety Answering Point (PSAP) or a Central Emergency Routing Center (CERC) that can send the appropriate emergency responders to a location provided by the automatic emergency routing device 110. In one embodiment, the emergency call center 140 may be an automated call center that can receive a request for help. The request for help to the automated call center may need to be provided in a predetermined format (e.g., format requiring type of emergency, location, and/or name of individual). While emergency call centers 140 and 150 are shown separately in FIG. 1, in one embodiment the emergency call centers 140 and 150 may be provided at the same location but different systems may be employed by the emergency call center to receive request for help over the different networks (e.g., communication link 132 which can be the internet and communication link 160 which can be a telephone network).

The automatic emergency routing device 110 allows for request for help from a mobile device 120/122 to be received and automatically routed to the appropriate emergency call center. The automatic emergency routing device 110 also provides for the request to the appropriate emergency call center to be transmitted using different systems and communication links. Accordingly, if one system and/or communication link is down (e.g., due to repairs or unplanned outage), the automatic emergency routing device 110 can automatically use another system and/or communication link to request help. The automatic emergency routing device 110 also provides for a more efficient, quicker and automated process to provide the needed information (e.g., location information, identification information, medical information, emergency contact information) to the emergency call center so that the appropriate emergency personnel can be dispatched and the right person notified of the emergency.

Figure 2:
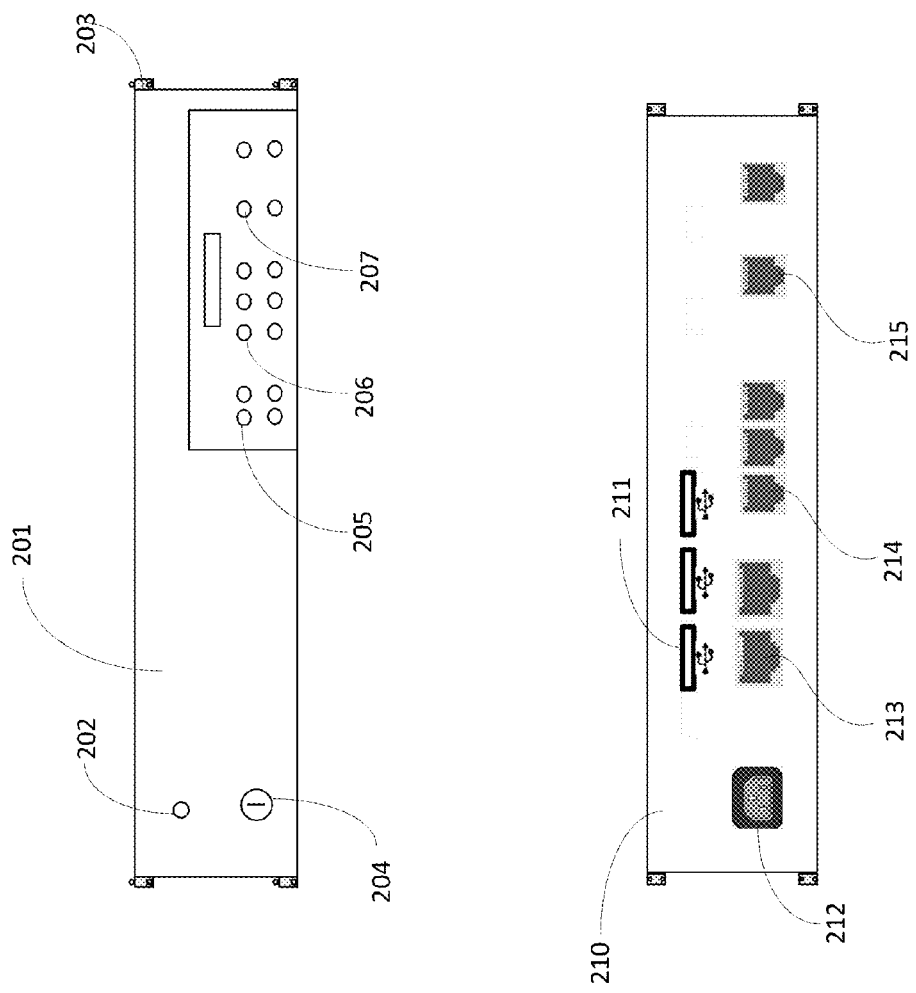
FIG. 2 illustrates an automatic emergency routing device according to one embodiment of this disclosure.

FIG. 2 illustrates an automatic emergency routing device 200 according to one embodiment of this disclosure. The automatic emergency routing device 200 may include hardware and software components that are configured to receive emergency data, determine an emergency call center to send a request for help (e.g., location of nearest PSAP or CERC), send emergency request data via a data network to the emergency call center when the data network is available, and automatically make an emergency call to the emergency call center when the data cannot be transmitted to the emergency call center (e.g., when data network is not available). In one embodiment, the automatic emergency routing device 200 may be a rack mountable device including the hardware and software component.

As shown in FIG. 2, a front panel 201 may include a power button 204 configured to selectively supply power to the automatic emergency routing device 200 via the power connector 212 provided, for example, on a back panel 210. When power is provided to the automatic emergency routing device 200, a power indicator light 202 may be activated when normal power is supplied. A plurality of indicators 205-207 may be provided on the front panel 201 to indicate operation of the automatic emergency routing device 200. In one embodiment, a display (e.g., a touch display) may be provided on the front panel 201 to display the operation state of the automatic emergency routing device 200 and/or to receive user instructions. The automatic emergency routing device 200 may be rack mountable using the rack mounts 203 provided on the front panel 201, the back panel 210 and/or side panels (not show in FIG. 2).

The back panel 210, which is opposite to the front panel 201, may include one or more of USB connectors 211, RJ45 Ethernet outlets 213, RJ11 telephony outlets 214, and/or telephony connection outlets 215. The USB connectors 210 may provide a connection for system maintained (e.g., software and/or firmware updates, updating security, updating data stored in memory or other storage associated with the automatic emergency routing device 200). The RJ45 Ethernet outlets 213 may provide a connection to networking equipment such as switches and routers for connectivity to the communication link (e.g., internet connectivity). When the RJ45 Ethernet outlets 213 are operational, the indicators 205 may be activated. The RJ11 telephony outlets 214 may provide a connection to the telephony equipment such as private branch exchange (PBX) or public switched telephone network (PSTN). When the RJ11 telephony outlets 214 are operational, the indicators 206 may be turned on. The telephony connection outlets 215 may provide a connection making a dial-up connection as a backup system. When the telephony connection outlets 215 are operational, the indicators 207 may be turned on.

Accordingly, the RJ45 Ethernet outlets 213, the RJ11 telephony outlets 214, and the telephony connection outlets 215 may each provide connection to a different communication link. With this system when a request for help cannot be made using one communication link the system may automatically cycle to the next communication link until a request for help can be successfully made. The system may cycle through each communication system/link and repeat the attempt to transmit the request for help until a request for help can be successfully made. The automatic emergency routing device 200 is not limited to the communication connections shown in FIG. 2 and may include other systems. For example, the automatic emergency routing device 200 may include wireless interface to provide wireless connectivity, an optical networking interface to connect to an optical network, and/or interface to provide connection via the USB connector (e.g., by coupling a wireless communication module to the USB connector).

Figure 3:
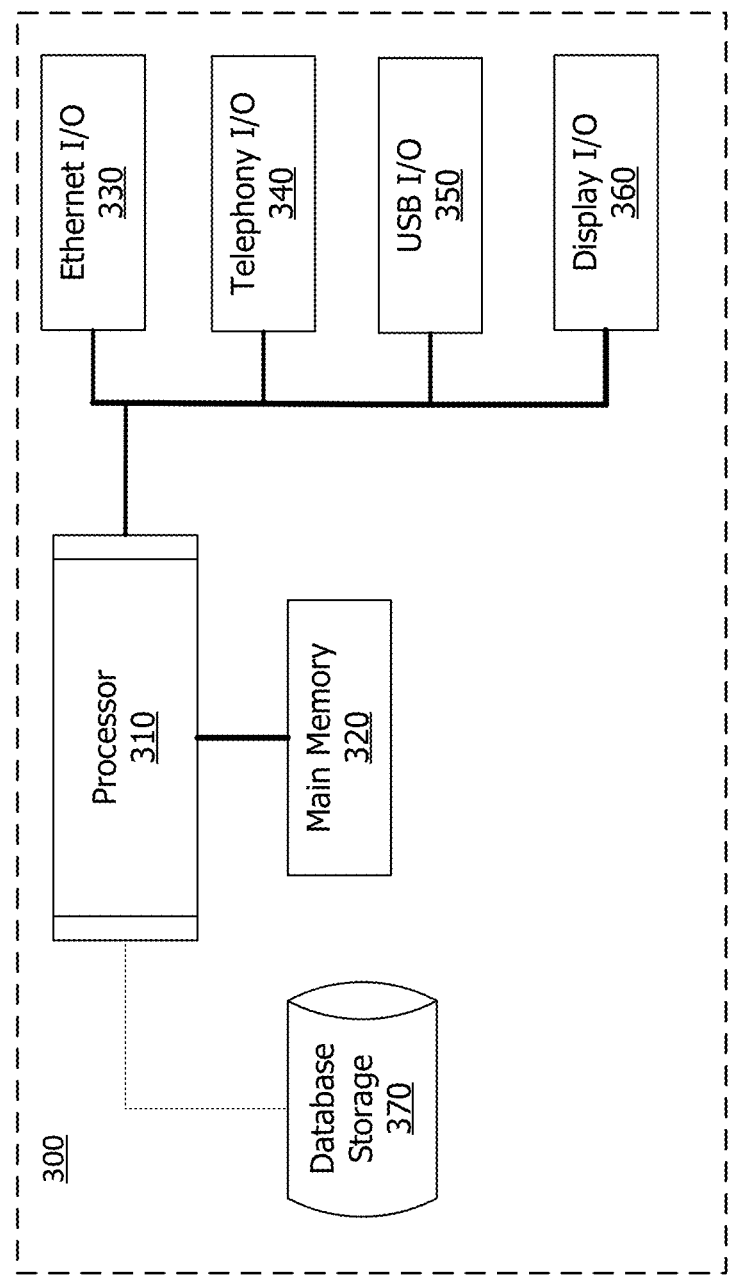
FIG. 3 illustrates a block diagram of an automatic emergency routing device according to an embodiment of the present disclosure.

FIG. 3 illustrates a block diagram of an automatic emergency routing device 300 according to an embodiment of the present disclosure. The automatic emergency routing device 300 may include one or more of a processor 310, main memory 320, Ethernet connections 330, telephone connections 340, USB connections 350, display/input device 360, and/or database storage 370. The processor 310 may include one or more computer processors for receiving data, processing data, and transmitting data. The processor 310 may execute one or more software programs stored in the database storage 370. The software programs or portions of the software may be loaded to the main memory 320 from the database storage 370. The main memory 320 may include one or more of ROM and/or RAM.

The Ethernet connections 330 and/or the telephone connections 340 may provide for data to be received from and transmitted to the mobile devices and/or the emergency call centers. The USB connections 350 may allow for updating the information stored in the database storage 370 and/or the main memory 320. For example, the software, firmware, user data, and/or emergency call center information may be updated. One or more of the USB connections 350 may also serve as a port to connect additional devices (e.g., display, input devices, and/or communication devices).

The display and/or input device 360 may display the operation state of the automatic emergency routing device 300, receive user input to control and/or modify the operation of the automatic emergency routing device 300, and modify/input data stored in the database storage 370 and/or the main memory 320. The display and/or input device 360 may be a touch panel display. While the database storage 370 is shown as being part of the emergency routing device 300, the database storage 370 may be removable storage (e.g., flash drive or a memory card) or may be provided outside of the emergency routing device 300. The database storage 370 may be cooled to the processor via one of the connections 330, 340 or 350. In one embodiment, the database storage 370 may be provided remotely from the emergency routing device 300 (e.g., at a server) and information may be received from and transmitted to the database storage 370 via a communication link.

While not separately illustrated in FIGS. 2 and 3, the automatic emergency routing device may include an emended we server for an administrator to update and/or configure the automatic emergency routing device.

Figure 4:
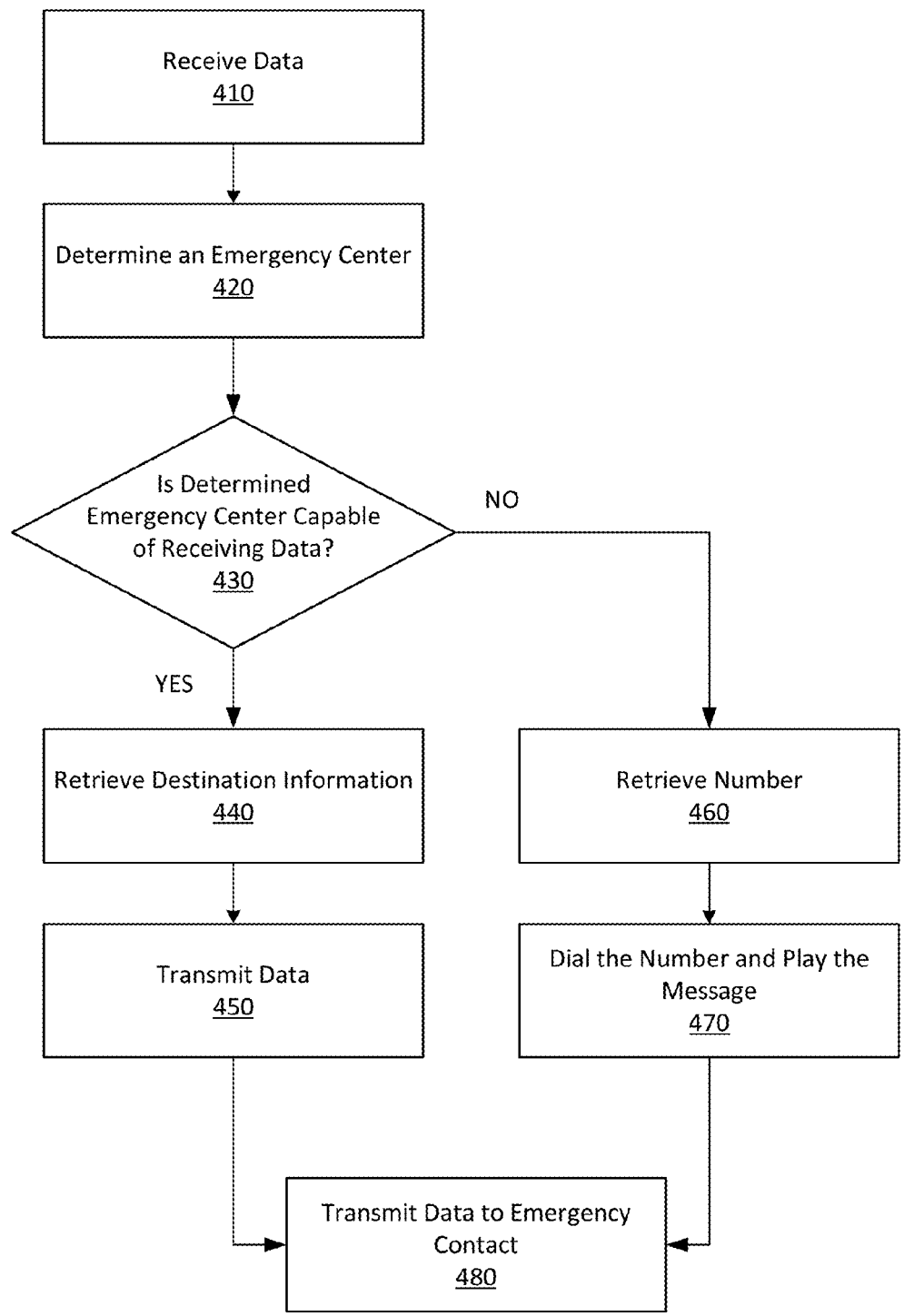
FIG. 4 illustrates a method for receiving a request for help and transmitting the request for help to an emergency call center according to an embodiment of the present disclosure.

FIG. 4 illustrates a method 400 for receiving a request for help and transmitting the request for help to an emergency call center according to an embodiment of the present disclosure. The method 400 may be performed, for example, by the automatic emergency routing device 110 shown in FIG. 1. The method 400 may include, receiving data from a mobile device 410, determining an emergency call center based on the received data 420, determining whether the determined emergency call center is capable of receiving data 430, if the determined emergency call center can receive data (YES in step 430), retrieving destination information 440 and transmitting the data 450, and if the determined emergency call center cannot receive data (NO in step 430), retrieving a number of the determined emergency call center 460, and/or dialing the number and playing a generated message 470.

The data may be received 410 from a device (e.g., mobile device 120, 122 shown in FIG. 1) over a communication link. The data may include a request for help. For example, the data may include a specific code or a flag that indicates that a request for help is requested by the mobile device. The request at the mobile device may be actuated by a user input on the device, a vocal request and/or by a result of analyzing data from sensors associated with the mobile device.

The received data may include one or more of identification information (e.g., name, age, and/or current address), medical information (e.g., medical history, medical profile, insurance information, and/or important medical information that may be needed by professionals to reference during the emergency), care physician information (e.g., name, address, contact number and/or email address), emergency contact information (e.g., name, address, contact number and/or email address of relative or other person selected to be notified in case of an emergency), and/or data captured by the mobile device (e.g., geographic location information, images, video, sound, heart rate, temperature, and/or motion data). The user of the mobile device may be provided with options (e.g., via a user interface) to input the data to be transmitted with the request for help and selectively determine which input data is transmitted with the request.

In one embodiment, location information and at least identification information (e.g., of the user and/or the mobile device) is always transmitted. In this embodiment, the user may not be provided with the option to not transmit this information. In one embodiment, the data that is transmitted by the mobile device and/or received by the automatic emergency routing device may include only the location information and identification information. The location information may include the geographic location of the mobile device and may be provided with GPS coordinates, latitude, longitude, and/or altitude, or a physical address of the location of the mobile device.

In some embodiments, the location information may be periodically received from the mobile device. For example, after the request for help with the initial location information is transmitted, the location information may be periodically transmitted and received by the automatic emergency routing device to provide an updated location of the mobile device.

The received data from the mobile device may be stored in the storage associated with the automatic emergency routing device. Based on the received data, a determination may be made of the emergency call center 420 to which the request for help should be transmitted. The determination may determine the emergency call center 420 that is associated with the location identified in the received data from the mobile device. The determination may be made based on the location information received with the request for help and information about emergency call centers accessible by the automatic emergency routing device. The location information received with the request for help may be compared to the location information of emergency call centers to determine the shortest path to the emergency call center (e.g., Public Safety Answering Point or a Central Emergency Routing Center). The emergency call center with the shortest path may be determined as the closest emergency call center to the location of the mobile device.

The information about the emergency call centers may be stored in the storage of the automatic emergency routing device or may be retrieved from a remote storage location that stores and periodically updates the information about the emergency call centers. The information about the emergency call centers may be stored in an emergency call center database. The information about the emergency call center stored in storage may be periodically updated. The information about the emergency call centers may include name, physical location, destination of where to transmit data (e.g., internet address or an email), a phone number, and/or alternative phone numbers. In some embodiments, for each emergency call center, information may be provided with a geographic area for which the emergency call center is responsible. For example, each emergency call center may be associated with a specific geographic region (e.g., based on zip code, county, state, city and/or other geographic criteria). The information about the emergency call centers may include a list of communication systems/link over which each emergency call center is capable to receive emergency request for help. For example, the information about the emergency call centers may include information about whether each specific emergency call center is capable of receiving data over the internet and/or whether the emergency call center can only receive phone calls.

In some embodiments, the determination of the emergency call center to which the request for help should be transmitted may include identifying the emergency call center that is associated with the geographic location identified in the received request for help instead of determining the shortest path to the emergency call center. In these embodiments, the location information received with the request for help from the mobile device may be compared to the geographic region associated with each emergency call center to determine which emergency call center is responsible for the location of the mobile device.

The determination of the emergency call center to which the request for help should be transmitted 130 may be performed by transmitting a request for the determination to be performed by a server. The server may be remotely located from the automatic emergency routing device or may be located in the same location. The server may receive the request with the location information and provide a respond with the details about one or more emergency call centers that are associated with the location of the mobile device. The server may store the database of the emergency call centers and periodically update the database.

The determination of whether the determined emergency call center is capable of receiving data 430, may include determining whether a first communication link (e.g., the internet) is available to transmit data from the automatic emergency routing device to the determined emergency call center. In one embodiment, the determination may be made by transmitting a request (e.g., a ping request) and receiving an acceptor response to determine that the emergency call center communication system is available and can accept the request for help over the first communication link. When the ping request cannot be sent or when the response is not received within a predetermined period of time, the determination may be made that the emergency call center is not cable of receiving the request for help over the first communication link. In another embodiment, the determination may be made based on information about the determined emergency call center stored in the storage as to whether the emergency call center is able to receive the request for help over the first communication link. This information may be updated based on the status (e.g., online or offline status) of the first communication link and/or the communication system of the determined emergency call center.

If the determination is made that the determined emergency call center is capable of receiving the data (YES in step 430), the data with the request for help may be transmitted to the determined emergency call center over the first communication link (e.g., the internet). The data with the request for help transmitted to the determined emergency call center may include the data received from the mobile device. The destination of where to transmit the data with the request for help 440 may be retrieved from the information about the emergency call centers stored in storage. In another embodiment, the destination of where to transmit the data may be retrieved from the confirmation that the emergency call center is cable of receiving data.

In one embodiment, the data with the request for help transmitted to the determined emergency call center may include additional data that was not received from the mobile device. For example, the automatic emergency routing device may store information about the user of the mobile device. This information may be pre-stored when the user registers the device with the automatic emergency routing device. In this embodiment, the data received from the mobile device may include identification information and location information, and the automatic emergency routing device may retrieve the additional information about the user (e.g., medical information and emergency contact information) based on the received identification information.

In one embodiments, the automatic emergency routing device may not store any data about the user. The automatic emergency routing device may only receive data about the user and/or the mobile device from the mobile device with the request for help. Accordingly, the automatic emergency routing device may not disclose personal information even if the security of the automatic emergency routing device is compromised.

In some embodiments, the automatic emergency routing device may convert some of the data received from the mobile device and provide it in a format that is more convenient or required by the emergency call center. For example, the automatic emergency routing device may convert the GPS coordinates to a physical address and transmit the physical address instead of the GPS coordinates to the emergency call center. In some embodiments, the emergency call center may require the information to be provided in a specific format or order and the automatic emergency routing device may convert and/or reorder the information about the user in an order required by the emergency call center. The requirements of each emergency call center, which may be different from each other, may be stored in the database.

A map server coupled to the automatic emergency routing device may provide the address or other representations of locations identified by the GPS coordinates. For example, the GPS coordinates may be used by the map server to identify an address, a name of location, name of people associated with the coordinates, name of one or more businesses associated with the coordinates, or another representation of the location of mobile device. In one embodiment, the functionality provided by the map server may be included in the automatic emergency routing device.

If the determination is made that the determined emergency call center is not capable of receiving the data (NO in step 430), an attempt may be made to transmit the request over another communication link. For example, a phone number for the determined emergency call center may be retrieved 460 (e.g., from the emergency call center database) and the request for help may be automatically transmitted using the retrieved phone number 470 over a telephone network. To transmit the request for help to the emergency call center using the phone number, the information about user of the mobile device requesting help may be automatically converted to an audio signal that is played after a connection with the emergency call center is established using the phone number. Converting the information about the user of the mobile device into audio signal may be performed by a text to speech application. The audio signal may be repeatedly played with the information about the user of the mobile device.

Accordingly, when the data cannot be transmitted over the communication link (e.g., because the internet is down), the automatic emergency routing device may automatically connect to the emergency call center via a telephone interface and automatically read the information including the location, identification, medical profile, and/or emergency contact information for the operator at the emergency call center. The automatic emergency routing device may receive a response from the operation to repeat specific information, provide additional information, and/or end the call.

When a request for help is received from the mobile device, the automatic emergency routing device may also transmit data to an emergency contact associated with the request for help 480. As discussed above, the data received form the mobile device may include emergency contact information. The automatic emergency routing device may transmit a notification of the emergency to the person or location identified in the emergency contact information. For example, the automatic emergency routing device may send a text message or a voice message to a phone number and/or e-mail identified in the emergency contact information. The emergency contact information may identify one or more of doctors, relatives, friends, and/or neighbors.

In step 420 discussed above, only a single emergency call center is identified. However, in some embodiments, a plurality of emergency call centers may be identified and ranked based on the proximity to the location identified in the received request for help. The ranked list of the plurality of emergency call center may also provide whether data to these emergency call centers can be transmitted over the communication link (e.g., over the internet) or whether a telephone interface needs to be used. When a connection cannot be established with the selected emergency call center, the next emergency call center on the ranked list may be selected for an effort to transmit the request for help. In one embodiment, when the selected emergency call center cannot respond to a request for help within a predetermined time period, the next emergency call center on the ranked list may be automatically contacted.

In one embodiment, the automatic emergency routing device may simultaneously transmit a request for help over different communication links and/or to a plurality of emergency call centers. For example, the automatic emergency routing device may simultaneously transmit data with a request for help over the communication link (e.g., the internet) and transmit an audio signal with the request for help over the telephone interface. As soon as a confirmation, from one of the emergency call centers is received with an indicating that the request for help is received, the other transmitting methods may be discontinued and/or a signal can be transmitted to stop the other requests for help.

While in the example illustrated in FIG. 4 shows two communication methods, the example can be expanded to include more communication methods that can be cycled through until a request for help can be transmitted successfully to the emergency call center. The method may cycle to the next communication method when a confirmation from the emergency call center is not received within a predetermined period of time or when a connection cannot be established using the current communication method within a predetermined period of time.

Figure 5:
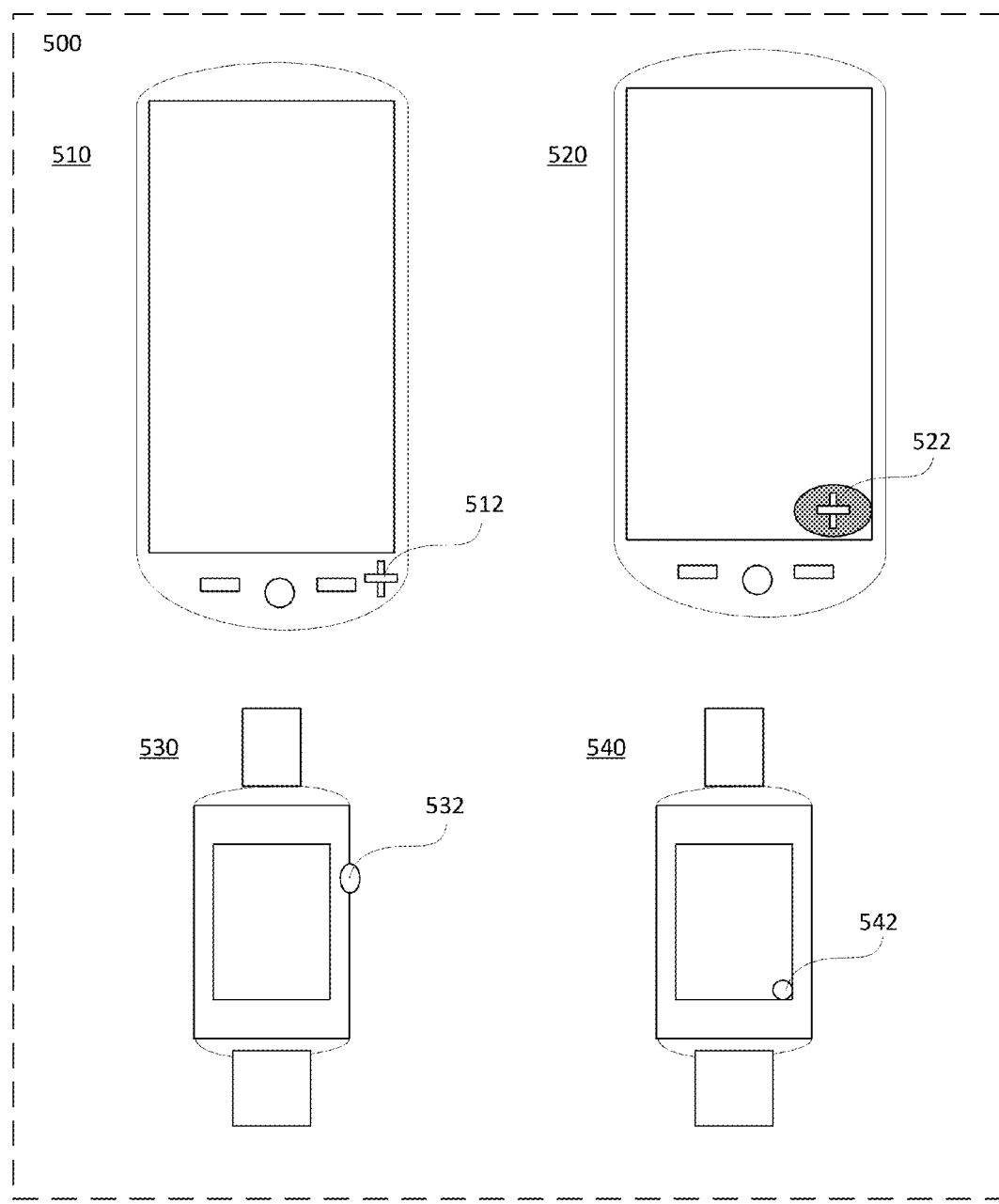
FIG. 5 illustrates mobile devices according to various embodiments of this disclosure.

FIG. 5 illustrates mobile devices 500 according to various embodiments of this disclosure. The mobile devices may include a portable electronic device 510, 520 or a wearable device 530, 540. While not show in FIG. 5, the mobile devices may include a processing system and memory configured to execute different application, receive data, transmit data, receive user inputs, and/or receive signals from one or more sensors associated with the mobile device.

The mobile devices may include a mechanism to transmit a request for help when requested by the user or when an incapacitated person is identified by the mobile device. The requesting help may include transmitting data to an automatic emergency routing device.

In one embodiment, the request for help may be requested with a single user operation. For example, the mobile device 510 or 530 may provide a button 512 or 532 (e.g., a hardware emergency button) that can be actuated by the user of the mobile device 510 or 530. The hardware emergency button 512 or 532 may be a physical button with mechanical and electrical switch mechanism. When the hardware emergency button 512 or 532 is pressed a signal may be transmitted to the application. While FIG. 5 illustrated the mobile device with a display, in one embodiment, the mobile device may not include a display.

In another embodiment, a software emergency button 522 or 542 may be provided on the mobile device 520 or 540. As shown in FIG. 5, the software emergency button 522 or 542 may be provided on a display portion of the mobile device 520 or 540. An application may display the software emergency button 522 or 542 on the display. In one embodiment, the software emergency button 522 or 542 may be always displayed on the display. The software emergency button 522 or 542 may be transparently displayed on top of other application executed on the mobile device. In another embodiment, the software emergency button 522 or 542 may be automatically displayed when the mobile device detect an emergency (e.g., sudden movement, irregular heartbeat, abnormal temperature, specific voice commands). When the user pressed the software emergency button 522 or 542, the application may trigger an emergency response.

The mobile device may include an application that detects an emergency situation when a user presses the hardware emergency button 512, 532 or a software emergency button 522, 542 on the mobile device. With the hardware emergency button 512, 532 or a software emergency button 522, 542, the user of the mobile device can request for help with a single operation (single input). In some embodiments, when the user of the mobile device is not able to press the button the button may be pressed by another user in the vicinity of the mobile device. In one embodiment, the mobile device may include a hardware emergency button and a software emergency button.

While not shown in FIG. 5, the mobile device may include a GPS, motion sensors, camera, microphone, speaker, heart rate monitor, temperature sensor and/or touch display. The data from these component may be received and processed by the processing system of the mobile device to detect an incapacitated person, detect a response form the user, and/or provide instructions to the user.

While FIG. 5 illustrates examples of a mobile device and the discussed embodiment in this application are discussed with reference to the mobile device, the request for help may be initiated when a hardware emergency button or a software emergency button is actuated on other devices. For example, the hardware emergency button and/or the software emergency button may be provided on a stationary computer, a home appliance, electronic equipment (e.g., a television, a game console, or a security system). In these devices, the location information may be captured by one or more sensors or manually stored in the device.

Figure 6:
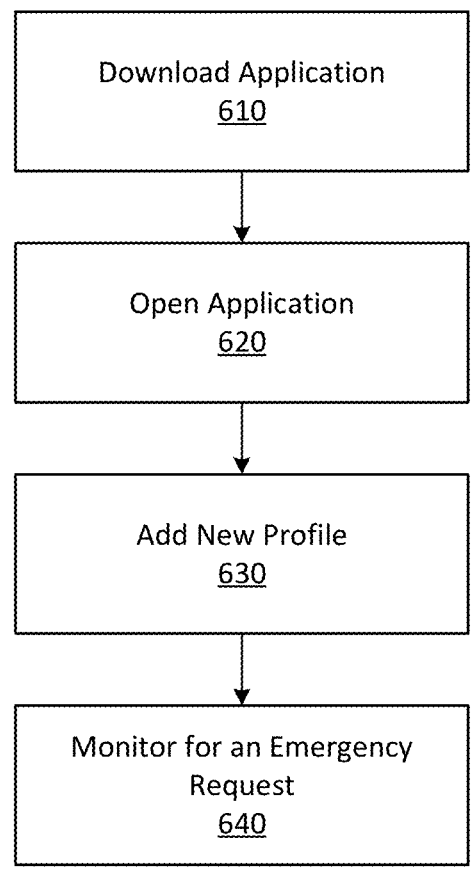
FIG. 6 illustrates a method for setting up an application for requesting emergency help according to an embodiment of the present disclosure.

FIG. 6 illustrates a method 600 for setting up an application for requesting emergency help according to an embodiment of the present disclosure. The method 600 may be performed by a mobile device. The method may include downloading an application 610, opening the application 620, adding a new profile 630, and monitoring for an emergency request 630.

The application may be downloaded 610 and opened 620 in response to one or more user requests. The application may be downloaded from a website, an application store and/or another user device. When the application is opened, a user interface may be displayed to request the user to register a new profile 630. Registering the new profile may include inputting user information in a data population interface. The requested user information may include, but is not limited to, identification information (name and/or address), medical information (e.g., medical history, medical profile, insurance information, and/or important medical information that may be needed by professionals to reference during the emergency), physician information, (e.g., name, address, contact number and/or email address), emergency contact information (e.g., name, address, contact number and/or email address of relative or other person selected to be notified in case of an emergency), special requests, and/or other medical data. The user interface may also allow the user to select which information is to be transmitted with a request for help. The user interface may also allow the user to select which data from the mobile device can be accessed by the application (e.g., camera data, microphone data, motion data, temperature data, and/or heart rate data) and/or transmitted with the request for help.

In one embodiment, the application may provide for multiple profiles to be stored on the mobile device and the user may select the profile that corresponds to the user carrying or wearing the mobile device.

Once the user profile is set up, the application may monitor for a request help 640 by monitoring whether a hardware emergency button or a software emergency button is actuated by the user or whether an incapacitated person is detected. When the button is actuated or an incapacity person is detected, the application may confirm that help is requested and/or request help by transmitting a request for help with other information (e.g., location and identification information).

In one embodiment, the mobile device may come with the application already downloaded and/or installed. In one embodiment, the application may be provided as an extension of another application (e.g., calling application). The extension may be stored on the mobile device.

In one embodiment, the registration of the application and adding profile information may be performed on a system (e.g., portable computer or a website) that is different from the mobile device, and the information may be transmitted to the mobile device.

Figure 7:
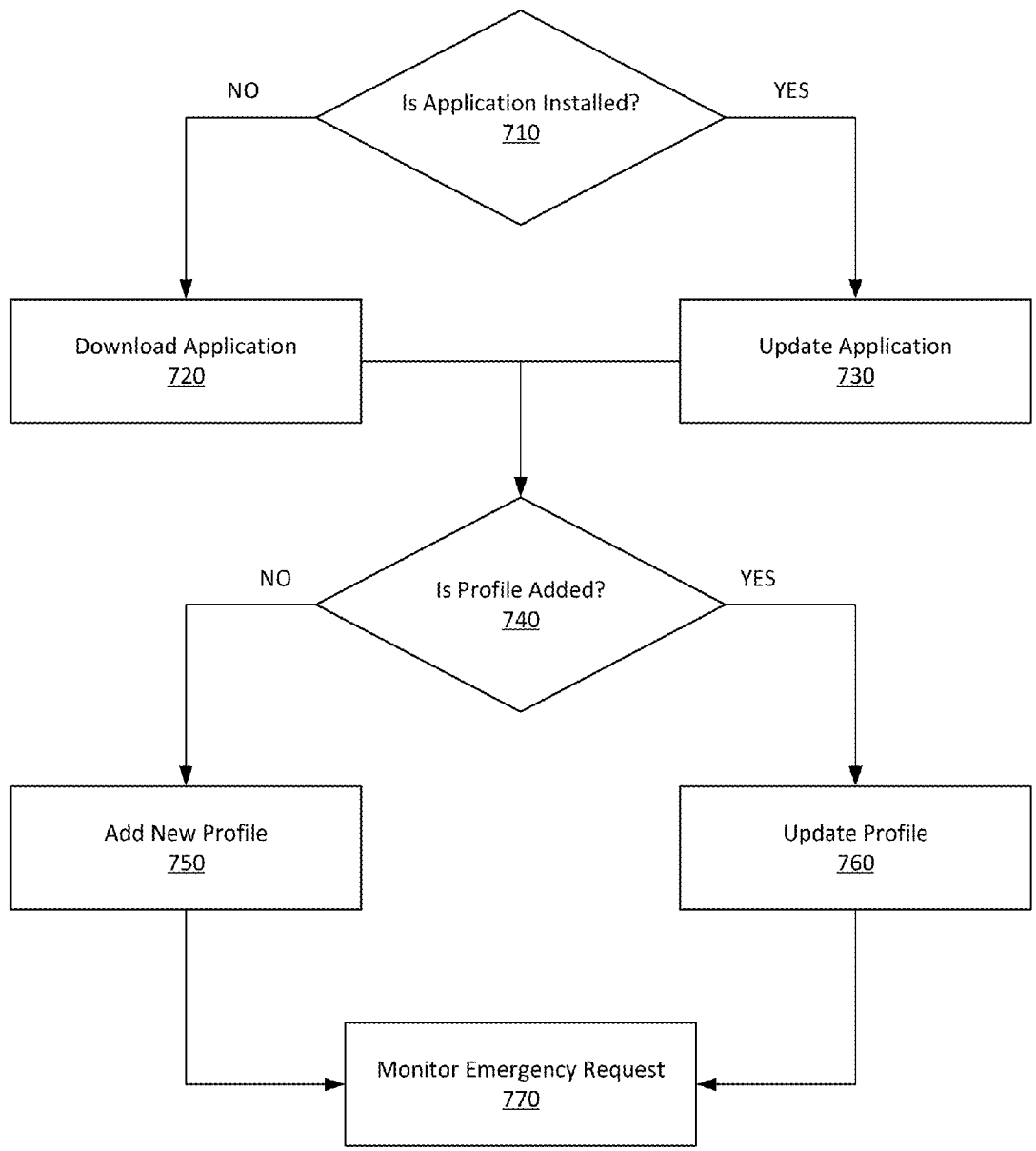
FIG. 7 illustrates a method for setting up an application for requesting emergency help according to another embodiment of the present disclosure.

FIG. 7 illustrates a method 700 for setting up an application for requesting emergency help according to another embodiment of the present disclosure. The method 700 may be performed by a mobile device. As shown in FIG. 7, first a determination may be made as to whether an application for monitoring emergency request is installed on the mobile device 710. If the application is not installed (NO in step 710), then the application may be downloaded and installed on the mobile device. If the application is installed (YES in step 710), the installed application may be updated 730 if an update for a version of the application installed on the mobile device is available. Updating the application and/or the user profile may be performed in response to user instructions.

When the application is executed, for example, a determination may be made as to whether a profile is already provided in the application 740. If a profile has not been added (NO in step 740), then a user interface may be displayed to provide the user with an option to input user information. At least some of the input user information may be transmitted with a request for help. If a profile has already been added (YES in step 740), then an option may be provided to update the user profile 760. After the user profile is set up or updated, the application is ready for monitor for a request for help 770. As discussed above, the application may monitor for a one touch emergency request actuated by a hardware emergency button or a software emergency button on the mobile device.

Figure 8:
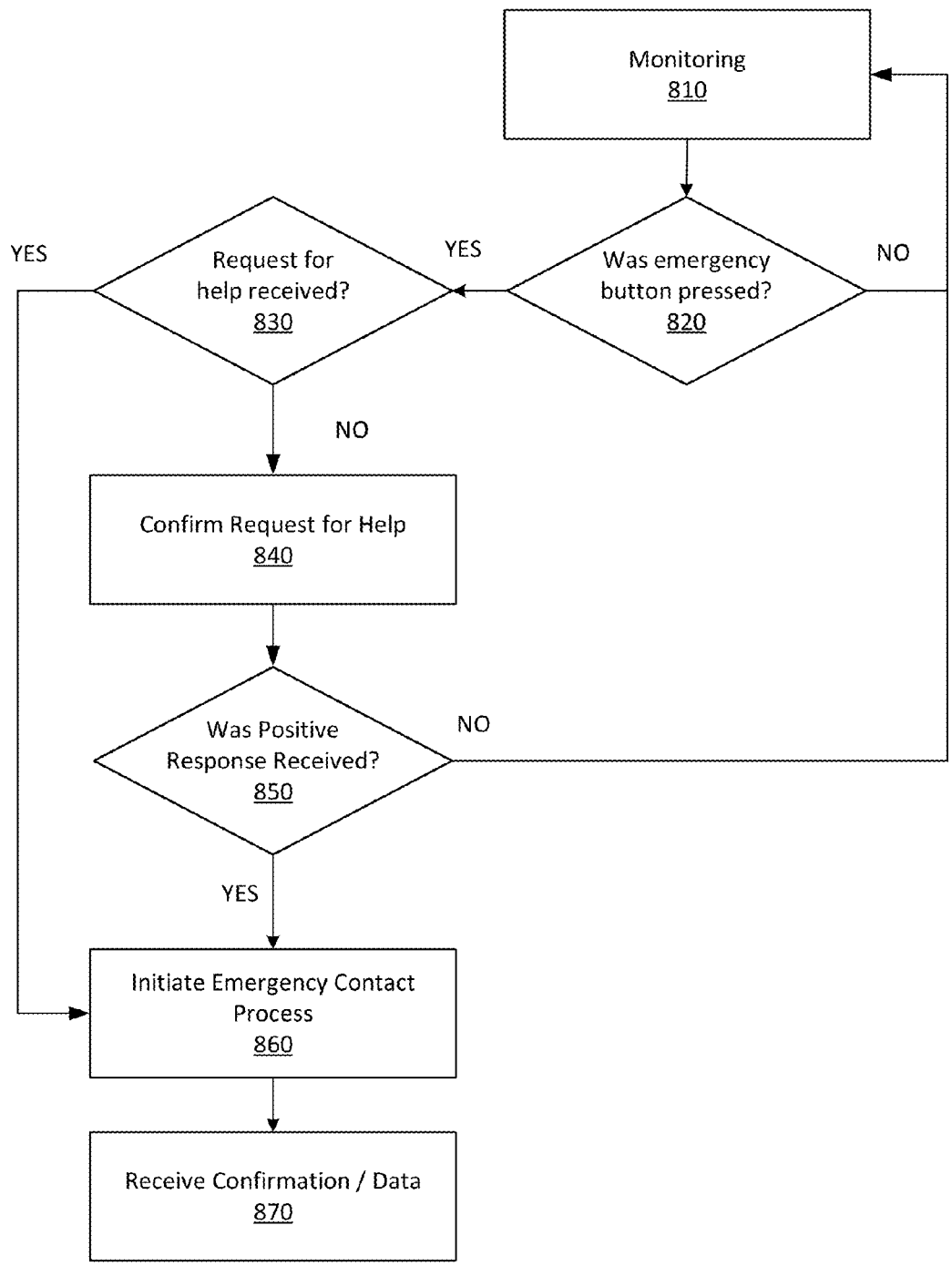
FIG. 8 illustrates a method for requesting help according to another embodiment of the present disclosure.

FIG. 8 illustrates a method 800 for requesting help according to another embodiment of the present disclosure. The method 800 may be performed by a mobile device. The method 800 may be performed by an application installed and executed on the mobile device.

The method 800 may include the mobile device monitoring for a request for help 810. The request for help may be monitored by determining whether an emergency button is pressed 820. If the emergency button is pressed (YES in step 820), a determination may also be made as to whether request for help received 830. If the emergency button is pressed (YES in step 820) and a request for help is received (YES in step 830), an emergency contact process may be initiated 860. The determination of whether a sound for help is made may be determined by monitoring the sound (e.g., via a microphone) to determine if the person asks for help. For example, the application may monitor whether the user makes a statement requesting "help" or whether the user makes a statement that that corresponds to a request that was previously recorded. In one embodiment, the determination of whether a sound for help is made may be made by measuring the sound level and requesting help when the sound level exceeds a predetermined sound level. In one embodiment, an average sound level may be measured and the predetermined sound level may be set based on the average sound level.

Instead of receiving the request for help by monitoring for sound in step 830, in one embodiment, the mobile device may monitor and analyze one or more of motion data, heart rate, image data, and/or temperature data to detect an abnormal condition in the vicinity of the mobile device and/or with the user. If the abnormal condition is detected, the determination may be made that the request for help is received (YES in step 830) and the application may initiate an emergency contact process 860. In one embodiment, the motion data and/or image data may be analyzed to determine if a fall or sharp movement happened at the time or before the button for request for help was actuated.

If the request for help is not detected (NO in step 830), the system may initiate a process to confirm whether a request for help is needed 840. The process to confirm whether a request for help is needed 840 may include generating vocal instructions (e.g., "Are you OK?") via a speaker on the mobile device or display text on a display of the mobile device asking whether the user needs help. The vocal instructions may be pre-recorded message that is played by the mobile device.

In response, the user may provide a vocal response, specific user input, hand motion that can be captured by the mobile device. Based on the captured data via a microphone, camera, or a user interface, the mobile device may determine whether a positive response is made 850. A positive response may include saying specific words (e.g., "Yes", "help," or "help is needed"), selecting yes on a user interface, selecting the emergency button a second time, specific hand motion, or head motion. If a positive response is made (YES in step 850), the application may initiate the emergency contact process 860. If a negative response is made (NO in step 850), the monitoring may be continued 810 and the emergency contact process may be suppressed. In one embodiment, if no response is made in a predetermined time period, the emergency contact process may be automatically initiated 860.

In one embodiment, the method 800 may be performed without step 830 and/or step 850. Accordingly, the initiating of the emergency contract process 860 may be performed immediately when the emergency button is pressed (YES in step 820).

The emergency contact process may include transmitting data with a request for help to an automatic emergency routing device. The location of where to transmit the data may be stored in the mobile device. The data may be transmitted using a communication link. The application may be configured to use different networks if one network is not able to transmit the request for help. The data with the request for help may include location information and identification information. In one embodiment, the data transmitted may include medical information of the user, physician information associated with the user, and emergency contact information for the user stored in the mobile device. In one embodiment, the data transmitted to the automatic emergency routing device may include geographic location information, images, video, sound, heart rate, temperature, and/or motion data captured by the mobile device.

In one embodiment, the mobile device may only transmit the location information and identification information. In this embodiment, the amount of data that is transmitted to request help is minimal while sufficient enough to request the needed help.

When the data with the request for help is received by the automatic emergency routing device, the automatic emergency routing device may transmit a confirmation that the request for help is received. The mobile device may receive the confirmation 870 and display a notification to the display or play a sound indicating that the request has been received and/or that help is on the way.

In one embodiment, the mobile device may receive, from the automatic emergency routing device, additional data. The additional data may include instructions to update the application on the mobile device. The additional data may include instructions that are displayed or played to the user on what to do until help arrives. These instructions may include, for example, to remain still, to drink water, and/or to lay down.

While the discussion is generally directed to receiving a request for help from one mobile device, the embodiment of the present disclosure may be applied to receive request for help from multiple mobile devices simultaneously and process these requests to, if needed, simultaneously request help to the location of the mobile devices to the same or different call centers.

The communication link (e.g., communication link 130 and/or 132 shown in FIG. 1) may be a network. The network may include: an internet, such as the Internet; an intranet; a local area network (LAN); a wide area network (WAN); an internal network, an external network; a metropolitan area network (MAN); a body area network (BAN); a vehicle area network (VAN); a home area network (HAN); a personal area network (PAN); a controller area network (CAN); and a combination of networks, such as an internet and an intranet. The network may be a wireless network (e.g., radio frequency waveforms, free-space optical waveforms, acoustic waveforms, etc.) and may include portions that are hard-wired connections (e.g., coaxial cable, twisted pair, optical fiber, waveguides, etc.).

Various storage devices (such as the memory or storage shown in FIG. 3) may be utilized herein to store data (including instructions). For example, storage device(s) may include volatile and/or nonvolatile memory (or storage). Nonvolatile memory may include one or more of the following: read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, or other types of nonvolatile machine-readable media that are capable of storing electronic data (e.g., including instructions). Volatile storage (or memory) devices may include random access memory (RAM), dynamic RAM (DRAM), synchronous DRAM (SDRAM), static RAM (SRAM), or other types of storage devices. Also, various components discussed in this application may communicate with other components through a computer network (e.g., via a modem, network interface device, or other communication devices).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols.

The above-illustrated software components may be tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

In the above description, numerous specific details are set forth to provide a thorough understanding of embodiments of the invention. The invention is capable of other embodiments and of being practices and carried out in various ways. One skilled in the relevant art will recognize, however that the invention can be practiced without one or more of the specific details or with other methods, components, techniques, etc. In other instances, well-known operations or structures are not shown or described in details to avoid obscuring aspects of the invention. Also, it is to be understood that the phraseology and terminology employed herein are for the purpose of the description and should not be regarded as limited.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

We claim:

1. An automatic emergency routing system comprising:
    storage storing a database including a plurality of emergency call centers, the database providing a location for each emergency call center;
    a processing system, including at least one processor and memory, the processing system being configured to:
        receive data from a mobile device, the received data including a location of the mobile device and identification information associated with a user, the identification information associated with the user includes at least one of sound, heart rate, or temperature of the user;
        based on the location of the mobile device included in the received data, identify at least one emergency call center included in the database that is associated with the location of the mobile device included in the received data;
        if data can be transmitted to the identified emergency call center over a data network, transmit, over the data network to the at least one identified emergency call center, data including the location of the mobile device and the identification information associated with the user; and if data cannot be transmitted to the at least one identified emergency call center over the data network, generate voice message identifying the location of the mobile device and the identification information associated with the user and play, over a telephone network, the generated voice message.

2. The automatic emergency routing system according to claim 1, wherein the database includes for each emergency call center a phone number and/or a destination where to send data over the data network.

3. The automatic emergency routing system according to claim 2, wherein the data is transmitted to one of the at least one identified emergency call centers over the data network using the destination included in the database of the identified emergency call center when the emergency center is capable of receiving data.

4. The automatic emergency routing system according to claim 2, wherein playing the generated voice message to the identified emergency call center over the telephone network includes automatically dialing a phone number of one of the at least one identified emergency call centers to place a call over the telephone network and playing the voice message when the emergency call center answers the call.

5. The automatic emergency routing system according to claim 1, wherein only one emergency call center is identified.

6. The automatic emergency routing system according to claim 1, wherein identifying the emergency call center in the database that is associated with the location of the mobile device includes identifying an emergency call center in the database with a shortest path to the location of the mobile device.

7. The automatic emergency routing system according to claim 1, wherein the location information for each emergency call center provided in the database provides a geographic area for which each respective emergency call center is responsible, and identifying the at least one emergency call center in the database that is associated with the location of the mobile device includes identifying at least one emergency call center in the database with a geographic area corresponding to the location of the mobile device.

8. The automatic emergency routing system according to claim 1, wherein the data received from the mobile device includes medical profile and/or history of the user associated with the mobile device, physician information associated with the user, and emergency contact information for the user.

9. The automatic emergency routing system according to claim 8, wherein the data transmitted to the at least one identified emergency call center over the data network includes the medical history of the user, the physician information associated with the user, and/or the emergency contact information for the user received from the mobile device.

10. The automatic emergency routing system according to claim 1, wherein the data received from the mobile device includes an image, the sound, the heart rate, the temperature, and/or motion data captured by the mobile device.

11. The automatic emergency routing system according to claim 1, wherein the storage includes a user list with a plurality of users and for each user storing user identification, medical history of the user, physician information associated with the user, and emergency contact information for the user.

12. The automatic emergency routing system according to claim 11, wherein the identification information identifies the user associated with the mobile device and the processing system is further configured to:

based on the received identification information of the user associated with the mobile device and the user identifications provided in the user list, determine the medical history, the physician information, and the emergency contact information for the user associated with the mobile device;

if data can be transmitted to the at least one identified emergency call center over the data network, the data transmitted to the at least one identified emergency call center over the data network includes transmitting the identified medical history, the identified physician information, and the identified emergency contact information; and if data cannot be transmitted to the identified emergency call center over the data network, generating the voice message includes identifying the identified medical history, the identified physician information, and the identified emergency contact information in the voice message.

13. The automatic emergency routing system according to claim 1, further comprising a mobile device including a hardware emergency button with a mechanical and electrical switch mechanism and/or a software emergency button displayed by an application executed on the mobile device, wherein when the hardware emergency button or the software emergency button is actuated, the mobile device is configured to initiate a process to request help by transmitting data with the request for help and the location of the mobile device.

14. The automatic emergency routing system according to claim 1, wherein the processing system is further configured to transmit a signal to the mobile device indicating that the at least one identified emergency call center has been contacted.

15. A computer implemented method for routing an emergency request, the method comprising: receiving, from a portable device, data indicating a request for help and including location of the portable device and identification information associated with a user, the identification information associated with the user includes at least one of sound, heart rate, or temperature of the user: transmitting, to a server, a request for information about an emergency call center that is associated with the location of the portable device included in the received data, the request including the location of the portable device; receiving, from the server, a phone number and a data network destination of the emergency call center that is associated with the location of the portable device; determining if data can be transmitted to the data network destination of the emergency call center that is associated with the location of the portable device; if data can be transmitted to the data network destination of the emergency call center that is associated with the location of the portable device, transmitting, to the data network destination, data including the location of the portable device and the identification information associated with the user; and if data cannot be transmitted to the data network destination of the emergency call center that is associated with the location of the portable device, generating an audio signal identifying the location of the portable device and identification information associated with the user, automatically dialing the received phone number to place a call to the emergency call center that is associated with the location of the mobile device, and playing the audio signal when the emergency call center answers the call.

16. The computer implemented method for routing an emergency request according to claim 15, wherein the location of the portable device includes GPS coordinates of the portable device.

17. The computer implemented method for routing an emergency request according to claim 15, wherein the determined emergency call center is a Public Safety Answering Point or a Central Emergency Routing Center.

18. A non-transitory computer-readable storage medium having stored therein a program executed by a computer of an emergency routing apparatus, the program, when executed, causing the computer to at least: receive, from a portable device, data indicating a request for help and including location of the portable device and identification information associated with the user, the identification information associated with the user includes at least one of sound, heart rate, or temperature of the user; determine an emergency call center associated with the location of the portable device included in the received data from the portable device; determine if data can be transmitted to the determined emergency call center over a first communication link; if it is determined that data can be transmitted to the determined emergency call center over the first communication link, transmit, using the first communication link, to the determined emergency call center data including the location of the portable device and the identification information associated with the user; and if it is determined that data cannot be transmitted to the determined emergency call center over the first communication link, generate an audio signal including the location of the portable device and the identification information associated with the user, and play the generated audio signal for the determined emergency call center using a second communication link.

19. The non-transitory computer-readable storage medium having the program stored therein according to claim 18, wherein the first communicate link comprises the internet and the second communication link comprises a telephone network.

20. The non-transitory computer-readable storage medium having the program stored therein according to claim 19, wherein the data received from the portable device further includes medical information of the user, physician information associated with the user, and emergency contact information for the user, and the data transmitted to the determined emergency call center using the first communication link includes at least one of the medical information of the user, the physician information associated with the user, and the emergency contact information for the user included in the received data from the portable device.

* * * * *